United States Patent [19]

Eckle et al.

[11] Patent Number: 4,634,324

[45] Date of Patent: Jan. 6, 1987

[54] TOOL HOLDER WITH RADIAL ADJUSTMENT MEANS FOR A TOOL, IN PARTICULAR A ROTARY TOOL

[75] Inventors: Otto Eckle, Loechgau; Walter Roser, Besigheim, both of Fed. Rep. of Germany

[73] Assignee: Komet Stahlhalter-und Werkzeugfabrik Robert Bruening GmbH, Besigheim, Fed. Rep. of Germany

[21] Appl. No.: 755,403

[22] Filed: Jul. 16, 1985

[30] Foreign Application Priority Data

Aug. 2, 1984 [DE] Fed. Rep. of Germany ....... 8422976

[51] Int. Cl.$^4$ ................................................ B23C 1/12
[52] U.S. Cl. .................................... 409/209; 407/37; 408/181
[58] Field of Search ............................ 407/36, 37, 39; 408/181, 185; 409/204, 209

[56] References Cited

U.S. PATENT DOCUMENTS

| | | | |
|---|---|---|---|
| 3,069,932 | 12/1962 | Sweeny | 408/185 |
| 3,083,442 | 4/1963 | Almen | 407/36 |
| 3,486,401 | 12/1969 | Kelm | 408/181 |
| 3,606,562 | 9/1971 | Wills | 408/181 |
| 4,229,128 | 10/1980 | Heisner | 407/37 |

FOREIGN PATENT DOCUMENTS 7438172 8/1975 Fed. Rep. of Germany .

*Primary Examiner*—John Sipos
*Attorney, Agent, or Firm*—Flynn, Thiel, Boutell & Tanis

[57] ABSTRACT

A tool holder with radial adjustment means. The tool holder has a connecting portion having a connecting shank, an intermediate portion and a head portion, and a tool receiving means for a tool, in particular a rotary tool. All three portions (2, 3, 4) are of substantially disc-like configuration and bear against each other with their faces (2a, 3a, 3b, 4a) which extend radially with respect to the axis (A) of the connecting shank. Provided at the periphery of the connecting portion (2) are two diametrally oppositely disposed recesses (8) into which two claws (9) arranged on the intermediate portion engage with radial play. Provided at the periphery of the intermediate portion (3) are two diametrally oppositely disposed recesses (14) which are displaced through 90° relative to the claws (9) and into which two claws (15) disposed on the head portion (4) engage with radial play. A first screwthreaded spindle (11) can be screwed in the connecting portion (2), in a first screwthreaded bore (10) which extends between the two recesses (8) of the connecting portion, the ends (11a, 11b) of the first screwthreaded spindle bearing without play against the claws (9) of the intermediate portion (3). A second screwthreaded spindle (17) can be screwed in the intermediate portion (3) in a second screwthreaded bore (16) extending perpendicularly to the first screwthreaded bore (10) and with its ends bears without play against two diametrally oppositely disposed inside surfaces of the head portion (4). Clamping screws (22, 25) which are in axis-parallel relationship are provided for pressing together the faces (2a, 3a, 3b, 4a) of the three portions (2, 3, 4).

6 Claims, 6 Drawing Figures

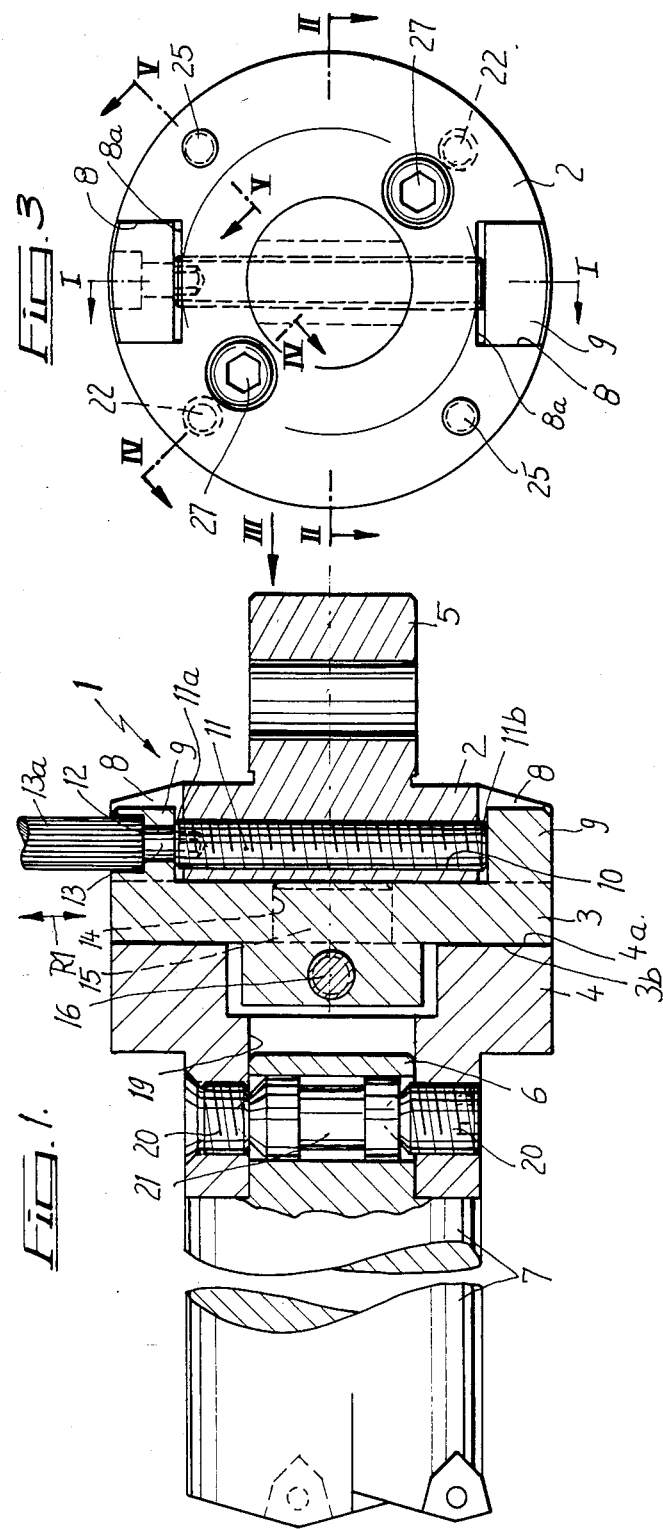

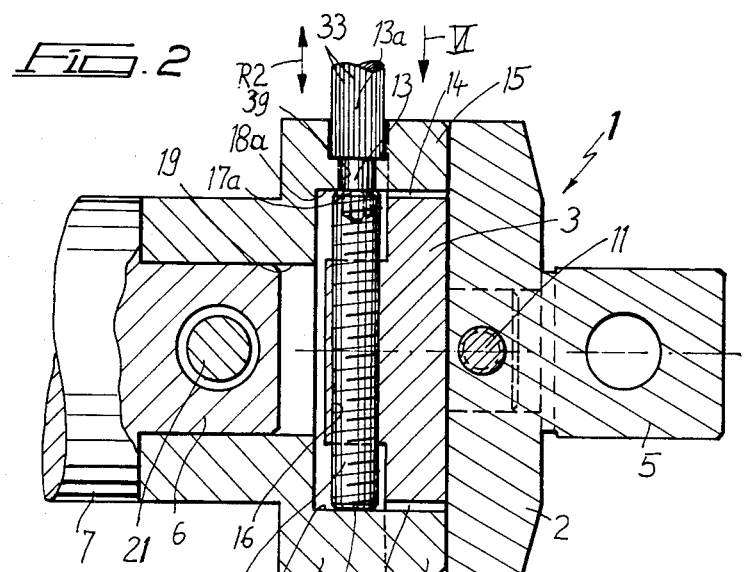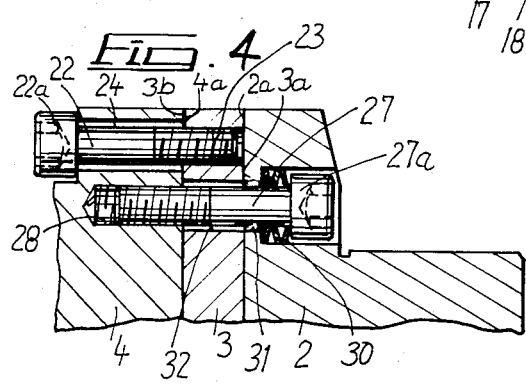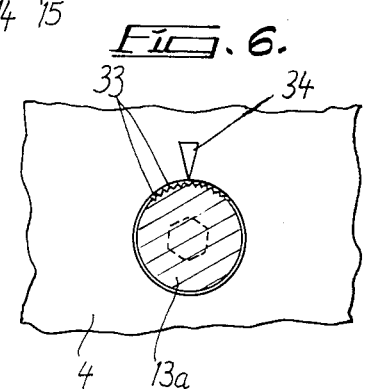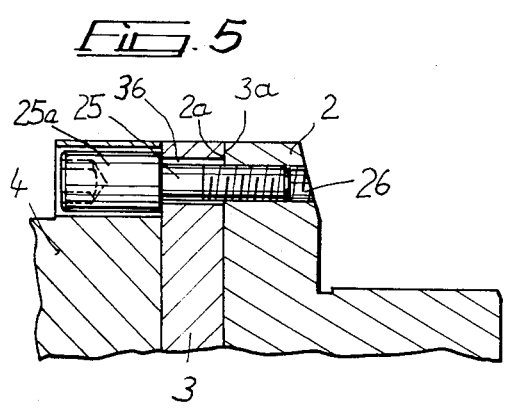

TOOL HOLDER WITH RADIAL ADJUSTMENT MEANS FOR A TOOL, IN PARTICULAR A ROTARY TOOL

FIELD OF THE INVENTION

The invention relates to a tool holder with radial adjustment means for a tool, in particular a rotary tool, comprising a connecting portion which at its free end has a connecting shank or the like and a screwthreaded spindle which extends radially with respect to the axis thereof, a head portion which is adjustable radially relative to the axis of the connecting shank with respect to the connecting portion and which at its free end has a tool receiving means, and a plurality of screws extending parallel to the axis of the connecting shank.

BACKGROUND OF THE INVENTION

In a known tool holder of that kind (German utility model No. 74 38172), the connecting portion has a housing with a radially extending guide. Mounted in the guide is a slider which belongs to the head portion and which is displaceable in a radial direction by means of the screwthreaded spindle. An inside turning or boring tool is fitted into the tool receiving means of the head portion. By rotating the screwthreaded spindle, it is possible to displace the head portion and thus the tool radially with respect to the axis of the shank thereby to alter the working diameter of the tool. That known tool holder is comparatively expensive to produce for the guide and the slider must be machined with a very high degree of accuracy in order to provide a play-free connection between the two components. In addition, by virtue of its design, the known tool holder is only suitable for very fine machining where low cutting forces occur. Another disadvantage of the known tool is also that adjustment of the head portion relative to the connecting portion can only be made in one radial direction. However, in the case of turnover or reversible bit borers which are used for producing bores in solid material, it is not only important that the working diameter of the borer can be altered by adjustment of the borer in a radial direction, but it is also important for the cutting bit which operates in the region of the axial centre line of the workpiece to be so arranged that it intersects the axial centre line of the workpiece. If the cutting edge is too high, then the axial centre line of the workpiece would extend beneath the cutting edge and the workpiece would not be cut in its region directly adjoining its axial centre line. The projecting portion that would then remain would bear against the breast of the effective cutting edge and the latter would then break off as a result of the pressure. If on the other hand the effective cutting edge is too low relative to the axial centre line, then it also leaves behind a small projecting portion. As that projecting portion meets the cutting edge at a highly disadvantageous angle, almost tangentially, it tries to climb up over the cutting edge, whereby its diameter increases. The projecting portion pushes the borer away or a counteracting force is produced, which can also result in the cutting edge breaking. It is therefore important for borers with turnover bits of that kind also to be able to be adjusted in a second direction which is normal to the first radial direction. In addition, reamers or broaches must be so set that their axis precisely coincides with the axial centre line of the workpiece.

The invention is based on the problem of providing a tool holder with radial adjustment means for a tool, in particular a rotary tool, of the kind set forth in the opening part of this specification, which permits radial adjustment of the tool in two mutually perpendicular directions, which is of a simple construction and of small dimensions, and which finally is also suitable for the transmission of high forces.

According to the invention, that is achieved in that an intermediate portion is disposed between the connecting portion and the head portion, that all three portions are of a substantially disc-like configuration and bear against each other with their faces which extend radially with respect to the axis of the connecting shank, that provided at the periphery of the connecting portion are two diametrally oppositely disposed recesses into which two claws arranged on the intermediate portion engage with radial play, that provided at the periphery of the intermediate portion are two diametrally oppositely disposed recesses which are displaced through 90° relative to the claws and into which two claws disposed on the head portion engage with radial play, that the screwthreaded spindle can be screwed in the connecting portion in a first screw-threaded bore extending between the two recesses of the connecting portion and with its ends bears without play against the claws of the intermediate portion, that a further screwthreaded spindle can be screwed in the intermediate portion in a second screwthreaded bore extending normal to the first screwthreaded bore and with its ends bears against two diametrally oppositely disposed inside surfaces of the head portion, and that the screws are provided as clamping screws for pressing together the faces of the three portions.

The novel tool holder permits adjustment of the tool which is fitted into the tool receiving means of the head portion, in two mutually perpendicular radial directions. It is of a simple construction, while the small number of individual components thereof are easy to machine. It is also of comparatively small structural dimensions. In addition, the three disc-like main components of the tool holder are firmly pressed together at their faces by the clamping screws, after the tool has been set, while in addition the claws engage into the respective recesses. Consequently, the novel tool holder is also suitable for transmitting high forces.

BRIEF DESCRIPTION OF THE DRAWINGS

The invention is described in greater detail hereinafter with reference to an embodiment illustrated in the drawings in which:

FIG. 1 shows a view of the tool holder in axial section taken along line I—I in FIG. 3, FIG. 2 is a view in axial section taken along line II—II in FIG. 3.

FIG. 3 is a view in the direction indicated by III in FIG. 1,

FIG. 4 is a partial view in axial section taken along line IV—IV in FIG. 3,

FIG. 5 is a partial view in axial section taken along line V—V in FIG. 3, and

FIG. 6 is a partial plan view in the direction indicated by VI in FIG. 2.

DETAILED DESCRIPTION

The tool holder 1 essentially comprises three main portions, namely the connecting portion 2, the intermediate portion 3 and the head portion 4. All three main portions are of a substantially disc-like configuration. A connecting shank or spigot 5 is provided at the free end of the connecting portion. The configuration of the connecting shank 5 advantageously corresponds to that of the connecting spigot or shank 6 of a tool 7 which is to be adjusted in two mutually perpendicular radial directions by means of the tool holder 1. The connecting shank 5 serves for connecting the tool holder directly to a machine tool spindle. However, it may also be fitted into an adaptor which is then in turn fitted into the machine tool spindle. Instead of the cylindrical connecting shank 5, it would also be possible to provide a steep taper portion or a flange for making the connection to the machine tool spindle.

The intermediate portion 3 bears with its annular face 3a against an annular face 2a of the connecting portion 2. In addition, the head portion 4 bears with its annular face 4a against the annular face 3b of the intermediate portion 3. The annular faces 2a, 3a, 3b and 4a each extend perpendicularly to the axis A of the connecting shank.

At its periphery, the connecting portion 2 has two recesses 8 at two diametrally oppositely disposed locations. At the corresponding locations, the intermediate portion 3 is provided with two claws 9 which, as can be seen from FIG. 3, engage into the recesses 8 with a precise fit without play in the peripheral direction, namely with a 20f 7 in 20H7 fit. However, play is present in the radial direction between each claw 9 and the floor 8a of each recess 8. The connecting portion 2 is further provided with a screwthreaded bore 10 which extends on a diameter between the two recesses 8. A first screwthreaded spindle 11 is screwed into the screwthreaded bore 10. The screwthreaded spindle 11 is fitted precisely between the two claws 9 so that its ends 11a and 11b bear against the inward sides of the claws 9. One of the claws 9 is also provided with a bore 12 therethrough, through which a screwdriver 13 can be passed. The screwdriver 13 can be used to turn the screwthreaded spindle 11 which has for example an M8×1 screwthread, so that the intermediate portion 3 can be displaced relative to the connection portion 2 in a first radial direction R1.

As shown in FIG. 2, the intermediate portion 3 is also provided with two recesses 14 at two diametrally oppositely disposed locations at its periphery. However, the recesses 14 are arranged displaced at 90° relative to the claws 9 of the intermediate portion 3. The head portion 4 is provided with two corresponding claws 15 which engage into the recesses 14 without play in the peripheral direction and with play in the radial direction. A second screw-threaded spindle 17 can be screwed in a screwthreaded bore 16 which extends perpendicularly to the screwthreaded bore 10. The second screwthreaded spindle 17 bears with its ends 17a and 17b, without play, against two diametrally oppositely disposed inside surfaces 18a and 18b of the head portion.

In the region of the second screwthreaded spindle 17, the head portion 4 has a throughbore 39 for the screwdriver 13. Rotation of the screwthreaded spindle 17 by means of the screwdriver 13 means that the head portion 4 can be displaced relative to the intermediate portion 3 in a second radial direction R2 which is perpendicular to the first radial direction R1.

At its free end, the head portion 4 is provided with a receiving bore 19 for receiving the shank 6 of the tool 7. The connection between the tool 7 and the tool holder 1 is made in the manner described in greater detail in German Pat. No. 3 108 439. The shank 6 is formed as a snug-fit portion and engages into the mating bore 19. The tool 7 is securely connected to the head portion 4 by means of the clamping screws 20 and the clamping pin 21. In a similar fashion, the connecting shank 5 may also be connected to a machine tool spindle of suitable configuration, or to an adaptor.

A first set of clamping screws 22 is provided for connecting the head portion 4 to the intermediate portion 3. The illustrated embodiment has only two diametrally oppositely disposed clamping screws 22 but if appropriate it is also possible for the first set to comprise a greater number of clamping screws. Each of the clamping screws 22 is screwed into a screwthreaded bore 23 in the intermediate portion and bears by means of its head 22a against the head portion 4. The clamping screw 22 is passed through a bore 24 in the head portion 4 with ample clearance so that the head portion 4 can be radially displaced relative to the intermediate portion 3, within certain limits.

As can be seen from FIG. 5, the clamping screws 25 of a second set are screwed into screwthreaded bores 26 in the connecting portion 2, bearing with their heads 25a against the intermediate portion 3. The clamping screw 25 is passed through the bore 36 in the intermediate portion 3 with sufficient clearance to permit radial displacement of the intermediate portion 3 with respect to the connecting portion 2.

Finally, the arrangement also has a third set of screws which are in parallel relationship to the axis, only one thereof being shown in FIG. 4. Those screws as indicated at 27 are screwed into screwthreaded bores 28 in the head portion 4, with plate springs 30 being arranged between the head 27a of the screw 27 and the annular shoulder 29. The diameters of the bores 31 and 32 in the connecting portion 2 and the intermediate portion 3 are once again of such a size relative to the screw 27 that the connecting portion 2 and the intermediate portion 3 can be displaced in the radial directions relative to the head portion 4.

The tool holder illustrated provides only for maximum adjustment movements of 2 mm, as that was sufficient for the specific situation of use. However, it is also possible to provide for greater adjustment movements, if the radial play between the claws 9 and 13, and the recesses 8 and 14 respectively, is of correspondingly larger magnitude.

OPERATION

Adjustment of the boring tool 7 may be effected in the following manner:

If the working diameter is to be precisely set, then the clamping screws 22 are released. Because of the screws 27 and the plate springs 30 however, the head portion 4 remains bearing against the intermediate portion 3. The tool 7 can be adjusted in the radial direction R2 by rotating the screwthreaded spindle 17 by means of the screwdriver 13. In order to give a guide in regard to the magnitude of the adjustment, the shank 13a of the screwdriver 13 is advantageously provided with a scale graduation 33 of for example 50 lines. The scale graduation co-operates with a marking 34 (see FIG. 6) on the head portion. As the screwthreaded spindle 17 has a pitch of 1 mm in one revolution, rotary movement of the screwthreaded spindle from one line of the scale graduation to the next corresponds to a radial adjustment of 0.02 mm. After the boring tool has been set to the desired working diameter, the clamping screws 22 are re-tightened whereby the head portion 4 is pressed with its annular surface 4a firmly against the annular surface 3b of the intermediate portion.

In order for the inward turnover-type cutting bit 35 of the borer 7 to coincide precisely with the axial centre line, the boring tool can be adjusted in the other radial direction R1 by firstly releasing the clamping screws 25, in which case the screws 27 hold the intermediate portion 3 against the portion 2. The boring tool 7 can be precisely set in the direction R1 by rotating the screwthreaded spindle 11 by means of the screwdriver 13. After the adjustment has been made, the clamping screws 25 are re-tightened whereby the face 3a of the intermediate portion 3 is again firmly pressed against the face 2a of the connecting portion.

Therefore, the novel tool holder 1 permits adjustment of the tool in two mutually perpendicular radial directions R1 and R2, independently of each other.

Instead of the boring tool illustrated in the drawings, it is also possible for other tools in respect of which radial adjustment is required in two mutually perpendicular directions to be fitted into the tool receiving means of the head portion, for example a boring bar or a reamer or broach. More specifically, in order to ensure that reamers or broaches run satisfactorily true, precise radial adjustment in two mutually perpendicular directions is a matter of primary importance.

The embodiments of the invention in which an exclusive property or privilege is claimed are defined as follows:

1. In a tool holder with radial adjustment means for a tool, in particular a rotary tool, comprising a connecting portion having an axially extending connecting shank and a first screwthreaded spindle which extends radially with respect to an axis thereof, a head portion which is adjustable radially relative to said axis of said connecting shank and with respect to said connecting portion, said head portion having at its free end a tool receiving means, and a plurality of clamping screws extending parallel to said axis of said connecting shank, the improvement comprising wherein an intermediate portion is disposed between said connecting portion and said head portion, wherein all three portions are of a substantially disc-like configuration and have their axially facing sides bearing against each other, which sides extend radially with respect to said axis of connecting shank, wherein two diametrally oppositely disposed first recesses are provided at the periphery of said connecting portion, said intermediate portion having two diametrically disposed first claws received in said first recesses on said connecting portion with radial play and without circumferential play, wherein two diametrally oppositely disposed second recesses are provided at the periphery of said intermediate portion, said second recesses being displaced through 90° relative to said first claws, said head portion having two diametrically disposed second claws received in said second recesses in said intermediate portion with radial play and without circumferential play, wherein said first screwthreaded spindle is threadedly received in a first screw-threaded bore in said connecting portion, the ends of said first spindle terminating at said first recesses on said connecting portion and bear without play against said first claws on said intermediate portion, wherein a second screwthreaded spindle is threadedly received in a second screwthreaded bore in said intermediate portion and extending normal to said first screwthreaded bore, the ends of said second spindle terminating at said second recesses and bear without play against said second claws on said head portion, and wherein said plurality of clamping screws connect respective pairs of said three portions together so that mutually opposed, axially facing surfaces are pressed together upon a tightening of said plurality of clamping screws, whereby, upon a loosening of said plurality of clamping screws, a rotation of one or both of said first and second screws will effect a movement of said head portion relative to said connecting portion radially along one radius or radially along two radii.

2. A tool holder according to claim 1, wherein said plurality of clamping screws include a first set of clamping screws for pressing an axially facing surface on said head portion against an opposed axially facing surface on said intermediate portion and a second set of clamping screws for pressing a further axially facing surface on said intermediate portion against an opposed axially facing surface on said connecting portion.

3. A tool holder according to claim 2, wherein said first set of clamping screws are screwed in screwthreaded bores in said intermediate portion and bear with their heads against said head portion, and wherein said second set of clamping screws are screwed in screwthreaded bores in said connecting portion and bear with their heads against said intermediate portion.

4. A tool holder according to claim 2, wherein said plurality of clamping screws include a further set of screws which are in parallel relation to said axis and which connect said connecting portion to said head portion, said further set of screws having plate springs interposed between heads thereon and said connecting portion.

5. A tool holder according to claim 1, wherein at least one claw on said intermediate portion and said head portion is provided with a radially extending through bore for passing therethrough a screwdriver which engages the respective screwthreaded spindles.

6. A tool holder according to claim 5, wherein a shank of said screwdriver has a scale graduation thereon.

* * * * *